Dec. 31, 1940.    J. F. RUSSELL    2,226,946
METHOD OF AND APPARATUS FOR HANDLING MILK
Filed March 14, 1936    2 Sheets-Sheet 1
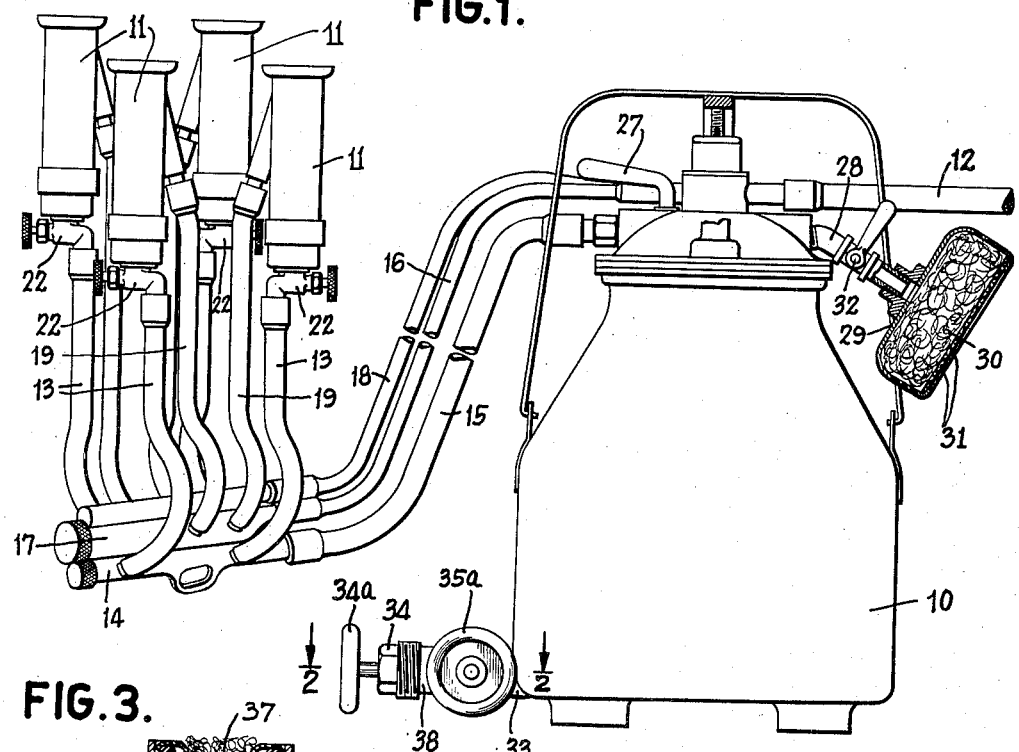
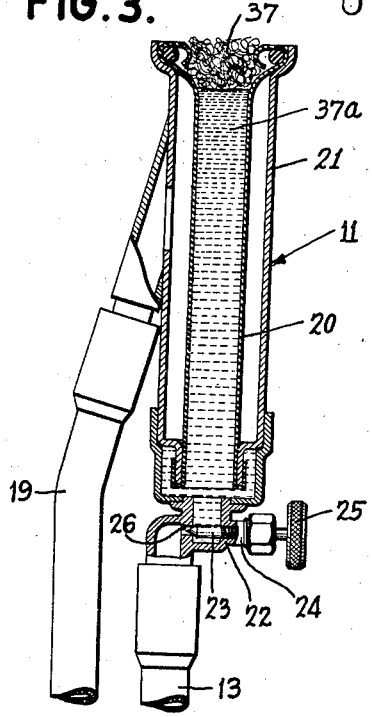
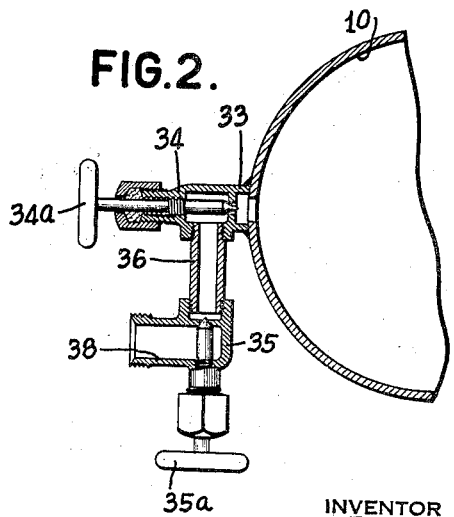
INVENTOR
John F. Russell
BY
E. C. Sanborn
ATTORNEY Dec. 31, 1940. J. F. RUSSELL 2,226,946
METHOD OF AND APPARATUS FOR HANDLING MILK
Filed March 14, 1936 2 Sheets-Sheet 2

INVENTOR
John F. Russell
BY E. C. Sanborn
ATTORNEY

Patented Dec. 31, 1940

2,226,946

UNITED STATES PATENT OFFICE 2,226,946

METHOD OF AND APPARATUS FOR HANDLING MILK

John F. Russell, New York, N. Y.

Application March 14, 1936, Serial No. 68,838

12 Claims. (Cl. 31—87)

This invention relates to a method and apparatus for obtaining milk under sterile conditions. In the art of obtaining and bottling milk it is considered highly important to obtain milk from the cows and transfer this milk to distributing containers under as sanitary conditions as possible.

My invention is concerned with the milking of cows under aseptic conditions, and handling the milk thus obtained in such a manner that contamination from exterior sources is prevented.

One object of my invention is to obtain milk from the cows under sterile conditions as distinguished from merely sanitary conditions. In this connection I have discovered that even the contact of milk with air which has not been filtered or sterilized contaminates the milk to a very surprising degree, and one feature of my invention resides in a method and apparatus whereby such air is prevented from entering the teat-cups of a milking machine and thus coming in contact with the milk.

A further object of my invention is to transfer the milk from a jar, or other receptacle ordinarily employed to receive it as it comes from the cow, to a bottle or other container under thoroughly sterile conditions.

Further objects and advantages of my invention will be more apparent from a description of one embodiment thereof illustrated in the drawings, in which Figure 1 is a side elevation of a milking jar and set of teat-cups in accordance with my invention.

Figure 2 is a horizontal cross section through a lower portion of the jar and the valves for withdrawing the milk therefrom, taken on the line 2—2 of Figure 1.

Figure 3 is a vertical cross section through the center of one teat-cup illustrating the individual valve therefor and showing the cup filled with either sterilized water or an antiseptic solution and cotton.

Figure 4:
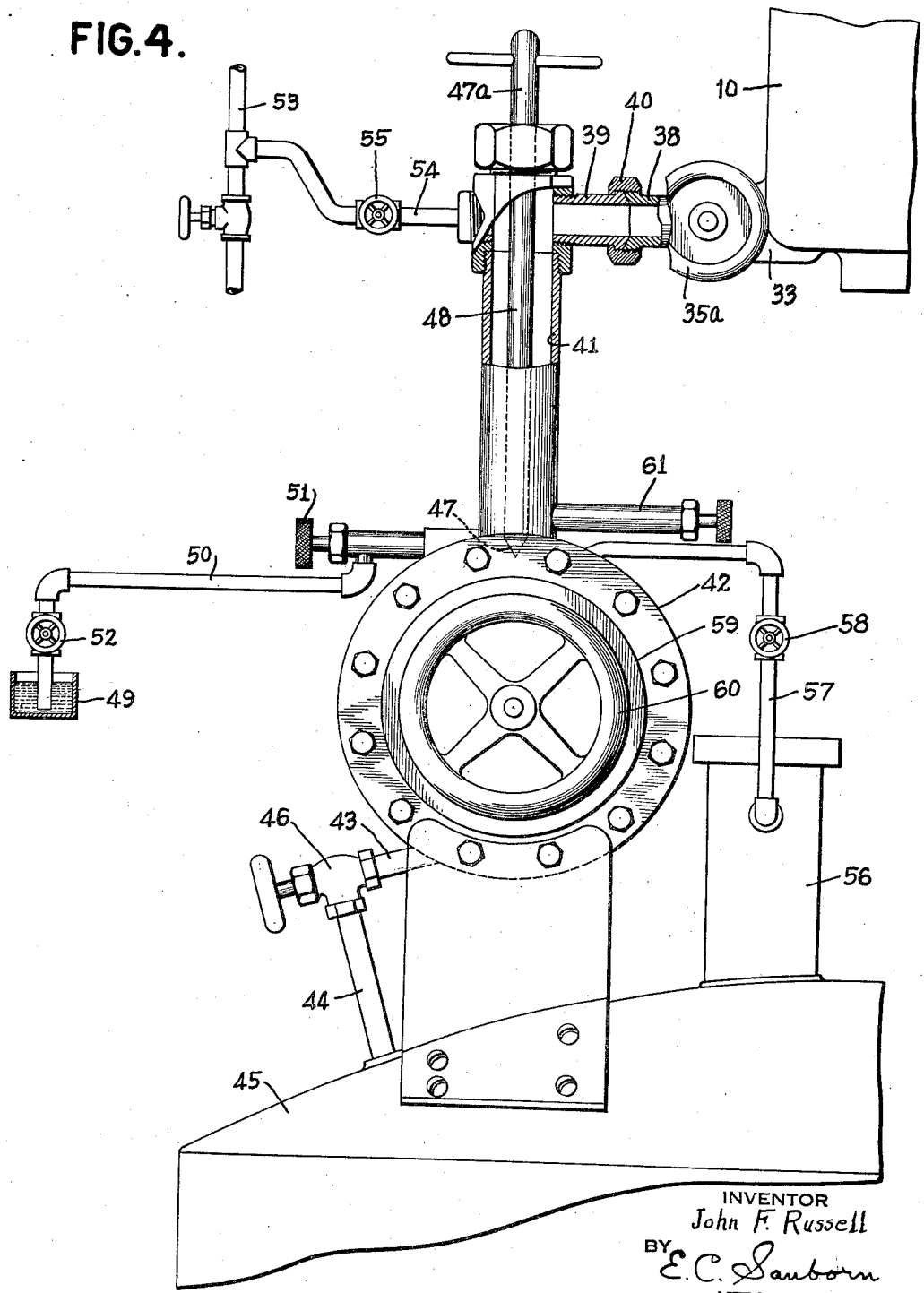
Figure 4 is a side elevation partly in section of apparatus for transferring milk from the milking jar to a bottling chamber.

In the drawings, numeral 10 designates a jar or other container adapted to receive milk from the teat-cups 11 during the milking operation. In accordance with usual practice, this jar may communicate with a suction or vacuum device (not shown) by means of the tube 12. A check valve may be employed at some point in the tube 12, preferably in the top or cover of the jar 10 or as close thereto as possible, to prevent barn air from rushing into the jar when the vacuum line is disconnected. Milk extracted from the cow is carried in the tubes 13 attached to the bottom of each teat-cup, to a common receiver 14 and thence to the jar 10 by way of the tube 15. The flow of milk into the jar may be controlled by a valve 27. The vacuum from the main line 12 may be transmitted by the tube 16 to a central cylinder 17 provided with a suitable automatically operating valve. The operation of this valve in a known manner effects a pulsating application of the vacuum to first one pair of the tubes 13 and then to the other pair.

Each cup 11 may comprise an inner flexible rubber liner 20 spaced from the outer wall 21. The tubes 19, which communicate with the spaces between the walls 21 and liners 20 and with the main conduit 18, allow the members 20 to collapse about the teat, when the vacuum is not applied to the interior of the liners through the connections 13. Other forms and arrangements of milking apparatus may be employed.

In accordance with my invention each of the vacuum tubes 13 is provided with an individual valve 22 adjacent the lower portion of their respective teat-cup 11, thus providing a separate control of the vacuum for each cup. Any suitable type of valve may be used, such as the needle valve shown, in which a stem 23 is threaded in a casing 24 and provided with an operating handle 25. The head of this valve when in closed position is seated in an opening 26.

For purposes of my invention another conduit 28 is provided, one end of which is in communication with the interior of the jar 10 and the other end of which opens into a receptacle 29. This receptacle 29 may be provided with openings 31 and filled with raw cotton 30 which may be subsequently sterilized. Thus by opening the valve 32, air is free to pass into the jar 10 only after being filtered through the sterilized cotton 30.

The lower portion of the milk jar is preferably provided with an outlet 33, controlled by a suitable valve 34. One side of this valve may be in communication with a second valve 35 by means of the relatively short section of pipe 36. These valves 34 and 35 may be of similar or different construction but are preferably each made up of a stem threaded in a casing and provided with suitable operating handles 34a and 35a, respectively.

In the operation of this device, the milking jar 10 with the seat of teat-cups 11 attached, is placed bodily in a receptacle for sterilizing. The teat-cups are preferably first stuffed with cotton batting 37 (Fig. 3) to prevent contamination by the air when the apparatus is removed from the sterilizing chamber. The receptacle 29 is also filled with raw cotton prior to sterilization. Sterilization is effected by introducing steam under pressure into the sterilizing chamber containing the milking apparatus, so that all of the apparatus is subjected to a temperature above 230° F. for a period of about thirty minutes or more. Ordinarily about 15 pounds pressure is sufficient for this purpose. When first placed in the sterilizing chamber all four of the valves 22, as well as valves 34 and 35, should be closed. Valves 32 and 27 may be left open in order to allow the steam to get inside the milking apparatus. As soon as sterilization is complete, the milking apparatus is removed from the chamber and the teat-cups are placed in a suitable rack or support to maintain them in an upright position. A liquid such as sterilized distilled water or an antiseptic solution is then introduced into each teat-cup through the cotton batting 37 in any suitable manner, as by means of a syringe, to substantially fill the cups as shown at 37a. Valve 32 is now closed and the vacuum producing machine is started. Each teat-cup 11 is then applied to the cow, after first removing the plug of cotton batting 37. As the teat sinks into the cup, it displaces most of the water therein and any amount that is left is insufficient to effect the quality of the milk. As each teat-cup is applied, its valve 22 is opened and the application of the vacuum serves to hold the cup in place.

Some provision is preferably made for cooling the milk as it is received in the jar 10. This may be accomplished by placing the jar 10 in a bath of ice water or cold brine, by surrounding the jar with a cooling coil supplied with a suitable refrigerant, or in any other desirable manner to effect prompt chilling of the liquid.

I prefer to employ the above described method of obtaining milk from cows which have had their udders and teats surgically cleansed just prior to milking as a further means for preventing contamination. In accordance with the preferred practice, the person to do the cleansing first washes and scrubs his hands with green soap and warm water, followed by an antiseptic solution. He then puts on sterilized rubber gloves and washes the cow's udder, particularly near the teats, and the teats with green soap and warm water, using a sterilized brush, and after rinsing goes over the parts again with a solution of some mild antiseptic.

As soon as milking is completed the valves 22 are closed and the teat-cups 11 are removed.

In accordance with my invention, the usual influx of unsterilized air through the teat-cups to the milking pail and the consequent contamination of the milk are prevented. The provision of individual valves for the teat-cups makes it possible to apply the cups one at a time to a cow without letting the barn air rush in through the free cups during the process. Cutting off the suction from each cup before removing it also renders such removal easier. It has been found possible by preventing this influx of unsterilized air to produce raw unpasteurized milk having an exceptionally low total bacteria count when tested according to approved methods.

As soon as the suction apparatus has been stopped or disconnected from the milking jar 10, sterilized air may be admitted to the jar through the pipe 28 to break the vacuum by slowly opening the valve 32. The milk in the jar 10 is then transferred to suitable bottling apparatus by means of pre-sterilized connections such as shown in Fig. 4.

With reference more particularly to Fig. 4, the outlet 38 of the milking jar 10 is connected to the pipe section 39 by means of the union 40. Section 39 opens into a casing 41 which in turn is connected to the chamber 42. The lower portion of chamber 42 is provided with outlet pipes 43 and 44 connected to the bottling apparatus 45 and the flow of milk to this bottling device is controlled by the valve 46. A suitable valve 47 is preferably employed in the lower portion of the conduit 41 and is operated by means of the relatively long valve stem 48 and handle 47a. The top of chamber 42 communicates with a liquid seal 49 by means of the pipe 50. Valves 51 and 52 may be provided in this pipe at points close to the receptacle 42 and the liquid seal 49, respectively.

Steam from a suitable source (not shown) may be supplied from the main pipe 53 to the top of the conduit 41 by means of the pipe section 54 and controlled by valve 55. Section 56 of the bottling apparatus is connected to the top of the chamber 42 by a pipe 57 provided with a suitable valve 58. The chamber 42 is preferably employed for measuring and/or storing the milk prior to transferring it to the bottling apparatus 45 and access may be had to the interior of this chamber 42 by means of the door 59 which may be opened and closed by a hand wheel 60. Any suitable bottling apparatus may be provided, although I prefer to employ bottling apparatus such as that shown and described in my co-pending applications Serial Number 678,867, filed July 3, 1933, and Serial Number 19,037, filed April 30, 1935.

The operation of this transfer and bottling apparatus is as follows. The milk jar 10 containing milk obtained from a cow as previously described is connected to the pipe section 39 by means of the union 40. It will be remembered that at this time the milk jar connections are sterilized up to the valve 35, the section 38 being no longer sterile by reason of its exposure to the atmosphere. Steam is now admitted to the transfer apparatus alone, or to these connections and the bottling apparatus, by opening the valve 55 and, if necessary, the valves 47, 46 and 58, while maintaining the valve 51 closed. Steam under pressure thus passes through all portions of the apparatus which will subsequently come in contact with the milk and these portions are all heated to a temperature above 230° F. for a sufficient period of time to effect complete sterilization. It has been found that the valve 35 and connection 38 become heated sufficiently to effect complete sterilization during this treatment. Heating of the milk is prevented by employing the two valves 34, 35 instead of one, and by connecting them with a pipe section 36 of suitable length to dissipate the heat before it reaches the milk jar 10. As soon as sterilization is complete the steam is cut off and the apparatus is allowed to cool, or artificially cooled by pouring water thereover, and the milk is transferred to the receptacle 42. This is accomplished, after first closing valve 46, by opening valves 34, 35, 51 and 52. The milk will then flow into the receptacle 42 without any possibility of contamination, the displaced air escaping through the liquid seal 49. As soon as the receptacle 42 is full, milk will flow through pipe 50 into the liquid seal 49, which may advantageously contain oil or a similar liquid. Valves 51, 52, and 47 are now closed and valves 46 and 58 are opened, admitting milk to the bottling apparatus 45, where it is suitably bottled under sterile conditions. By means of the pipe 57, sterilized air in the bottling chamber 45 is allowed to pass into the top of chamber 42 and thus permits the milk to flow out when valve 47 is closed.

For continuous operation of the bottling apparatus and to obviate the necessity of sterilizing the whole apparatus for each batch of milk, a different procedure may be carried out when the second jar of milk is attached to the union 40. It is simply necessary in this case, to close the valve 47 and admit steam directly to the conduit 41 and pipe sections 39 and 38. To insure admittance of steam to all parts of the connections, a bleeder valve 61 is preferably employed adjacent and immediately above the valve 47. In this case steam is admitted only to the connecting passageways, which are sterilized as previously described. The supply of steam is then cut off, the pipes cooled, and the valves 47, 34 and 35 opened to transfer the milk as previously described.

While I have shown and described my invention in connection with a measuring or storage chamber 42, this is not necessary, it being clear that the milk may be transferred directly to the bottling apparatus if this is of sufficient size. If the precautions outlined above are taken and the cows are suitably looked after and selected, it is not necessary to pasteurize the milk obtained in accordance with my invention. Although not necessary, I wish it to be distinctly understood that that my process does not exclude such a pasteurization step if it should be desirable for any reason. For this purpose the receptacle 42 may be suitably provided with heating and cooling coils and the milk pasteurized therein prior to bottling, or pasteurization may be accomplished in a separate apparatus. One manner of accomplishing pasteurization comprises heating the milk out of contact with air and under a positive pressure. Usual temperatures and agitation are preferably employed. The chamber 42 may be suitably designed for carrying out such a pasteurization under pressure.

The liquid seal 49 in addition to its action as a gage of the quantity of milk in receptacle 42 serves the purpose of allowing the air to escape from the chamber 42 as the milk flows in.

Many modifications of this apparatus may be made within the spirit of my invention as will be apparent to those skilled in the art. For example, the connecting pipes may be so arranged as to permit several milk jars to be connected to the conduit 41 at the same time, instead of just one as shown. If desired suitable connections with the source of steam may be made so that the bottling apparatus 45 and storage chamber 42 may be sterilized independently of the transfer connections.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:
1. A method of obtaining milk under sterile conditions comprising stuffing a set of teat-cups with material for preventing contact of unsterilized air therewith, sterilizing said teat-cups and a milk receiving receptacle, applying a suction to said receptacle while excluding unsterilized air therefrom, and successively removing the stuffing material from said cups and applying the same to a cow to be milked.

2. A method of obtaining milk under sterile conditions comprising stuffing a set of teat-cups with material for preventing contact of unsterilized air therewith, sterilizing said teat-cups and a milk receiving receptacle, introducing a sterilized liquid into said cups through said material, applying a suction to said receptacle while excluding unsterilized air therefrom, and successively removing the stuffing material from said cups and applying the same to a cow to be milked.

2. A method of obtaining milk under sterile conditions comprising sterilizing a milk receiving receptacle and set of teat-cups, connecting said receptacle to a source of suction, introducing milk into said receptacle while excluding unsterilized air therefrom, disconnecting said source of suction and breaking the partial vacuum in said receptacle by admitting sterilized air, connecting said receptacle with a container, sterilizing the connections, and transferring the milk to said container by means of the sterilized connections.

4. A method of obtaining milk under sterile conditions comprising introducing milk from a cow directly into a sterilized receptacle while excluding unsterilized air therefrom, connecting said receptacle to a receiver, sterilizing the connections between said receptacle and receiver while connected, and flowing the milk to said receiver through the sterilized connections.

5. A method of obtaining milk under sterile conditions comprising introducing milk from a cow directly into a sterilized receptacle while excluding unsterilized air therefrom, exposing the interior of said receptacle to a source of sterilized air, connecting said receptacle to a receiver, sterilizing the connections between said receptacle and receiver while connected, and flowing the milk to said receiver through the sterilized connections.

6. A method of obtaining milk under sterile conditions comprising introducing milk from a cow directly into a sterilized receptacle while excluding unsterilized air therefrom, connecting said receptacle to a receiver, simultaneously sterilizing the connections and said receiver while connected, and flowing the milk from said receptacle to said receiver.

7. A method of obtaining milk under sterile conditions comprising introducing milk from a cow directly into a sterilized receptacle while excluding unsterilized air therefrom, exposing the interior of said receptacle to a source of sterilized air, connecting said receptacle to a receiver, sterilizing the connections between said receptacle and receiver while connected, and flowing the milk to said receiver through the sterilized connections while permitting the air to escape from said receiver.

8. Apparatus for handling liquids under sterile conditions comprising a receptacle, means for admitting sterilized air to said receptacle, a receiver, connectable means for transferring liquid from said receptacle to said receiver, and means for sterilizing said transfer means, said receptacle, receiver and transfer means being so constructed and arranged that sterilization may be effected while the elements are connected without exposing the contents of the receptacle to the effect of the sterilizing medium.

9. A milk receiving receptacle provided with means for admitting sterilized air, outlet connections for withdrawing a liquid therefrom comprising a pair of valves spaced from each other, a receiver, a conduit connecting one of said valves and said receiver, and means for introducing steam into said conduit between said receiver and said valves.

10. A milk receiving receptacle provided with means for admitting sterilized air, outlet connections for withdrawing a liquid therefrom comprising a pair of valves spaced from each other, a receiver, a conduit connecting one of said valves and said receiver, means for introducing steam into said conduit, and means remote from said introducing means for permitting air in said conduit to escape.

11. A method of obtaining milk under sterile condition comprising stuffing a set of teat-cups with material for preventing contact of unsterilized air therewith, sterilizing said teat-cups and a milk receiving receptacle, and removing the stuffing material from said cups as they are applied to a cow.

12. In a method of milking the steps of introducing milk from a cow directly into a receptacle, connecting said receptacle to a receiver, sterilizing the connections between said receptacle and receiver while connected without exposing the milk to the effect of the sterilizing medium, and flowing the milk to said receiver through the sterilized connections.

JOHN F. RUSSELL.